(12) United States Patent
Sato

(10) Patent No.: US 12,247,616 B1
(45) Date of Patent: Mar. 11, 2025

(54) GAS BEARING PAD

(71) Applicant: NSK LTD., Tokyo (JP)

(72) Inventor: Toshinori Sato, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/284,628

(22) PCT Filed: Mar. 9, 2022

(86) PCT No.: PCT/JP2022/010434
§ 371 (c)(1),
(2) Date: Sep. 28, 2023

(87) PCT Pub. No.: WO2022/209685
PCT Pub. Date: Oct. 6, 2022

(30) Foreign Application Priority Data

Mar. 31, 2021 (JP) .................................. 2021-062325

(51) Int. Cl.
*F16C 32/06* (2006.01)
(52) U.S. Cl.
CPC ...... *F16C 32/0618* (2013.01); *F16C 32/0666* (2013.01); *F16C 2226/60* (2013.01); *F16C 2300/32* (2013.01)
(58) Field of Classification Search
CPC .............. F16C 32/0603; F16C 32/0618; F16C 32/0666; F16C 2226/60; F16C 2300/32
See application file for complete search history.

(56) References Cited

U.S. PATENT DOCUMENTS

| 3,475,065 A | * | 10/1969 | Weichsel | .............. | F16C 29/025 |
| | | | | | 384/12 |
| 3,744,858 A | | 7/1973 | Weichsel | | |
| 5,800,066 A | * | 9/1998 | Hayashi | .............. | F16C 32/0622 |
| | | | | | 384/114 |

(Continued)

FOREIGN PATENT DOCUMENTS

| JP | 2-66507 U | 5/1990 |
| JP | 3-239810 A | 10/1991 |

(Continued)

OTHER PUBLICATIONS

International Search Report (PCT/ISA/210) dated May 17, 2022, issued by the International Searching Authority in counterpart International Application No. PCT/JP2022/010434.

(Continued)

*Primary Examiner* — Phillip A Johnson
(74) *Attorney, Agent, or Firm* — Sughrue Mion, PLLC

(57) ABSTRACT

The gas bearing pad includes a main body portion including a recess portion, a porous body fitted into the recess portion of the main body portion, and a bolt inserted into a bolt insertion hole provided in the porous body and fixing the porous body to the main body portion. A gas bearing is formed between the porous body and the base by blowing compressed gas from the main body portion through the porous body toward the base. A counterbore hole that accommodates a head portion of the bolt is provided in the bolt insertion hole. In the counterbore hole, a space is provided between a top surface that faces the guide surface in the head portion of the bolt and a bearing surface that faces the guide surface of the porous body.

2 Claims, 2 Drawing Sheets

(56) References Cited

U.S. PATENT DOCUMENTS 10,557,501 B1 * 2/2020 Chien ................ F16C 32/0644

FOREIGN PATENT DOCUMENTS

| JP | 2811867 B2 | | 10/1998 |
|----|----|----|----|
| JP | 2000199522 A | * | 7/2000 |
| JP | 2006-29395 A | | 2/2006 |
| JP | 2007315611 A | * | 12/2007 |
| JP | 2019-190591 A | | 10/2019 |

OTHER PUBLICATIONS

Written Opinion (PCT/ISA/237) dated May 17, 2022, issued by the International Searching Authority in counterpart International Application No. PCT/JP2022/010434.

Communication issued on Mar. 12, 2024 by the Japan Patent Office for Japanese Patent Application No. 2021-062325.

* cited by examiner

GAS BEARING PAD

CROSS-REFERENCE TO RELATED APPLICATIONS

This application is a National Phase Entry of PCT International Application No. PCT/JP2022/010434 filed on Mar. 9, 2022, which claims priority to Japanese Patent Application No. 2021-062325 filed on Mar. 31, 2021, the contents of all of which are incorporated herein by reference in their entirety.

TECHNICAL FIELD

The present invention relates to a gas bearing pad, for example, a gas bearing pad that is used in machine tools, precision machines, ultra-precision machines, and the like, and used for horizontal movement of an object.

BACKGROUND ART

As a gas bearing pad of the related art, a gas bearing pad including a main body portion including a recess portion on a surface thereof; a porous body fitted into the recess portion of the main body portion; and a bolt inserted into a bolt insertion hole provided in the porous body to fix the porous body to the main body portion, in which a counterbore hole that accommodates a head portion of the bolt is provided in the bolt insertion hole, is known (for example, refer to Patent Literature 1). In Patent Literature 1, the head portion of the bolt that fixes the porous body to the main body portion is cut such that the cut surface of the head portion of the bolt is formed to be flush with the bearing surface of the porous body.

CITATION LIST

Patent Literature

Patent Literature 1: JP2811867B

SUMMARY OF INVENTION

Technical Problem

Incidentally, in general, the porous body in the gas bearing pad is formed of graphite or the like, and the main body portion is formed of ceramic or the like, both of which are formed of materials with high hardness. On the other hand, the bolt for fixing the porous body to the main body portion is generally formed of a ferrous material with relatively low hardness.

In the gas bearing pad described in Patent Literature 1, when foreign matter enters between the gas bearing pad in drive and the base, the intruded foreign matter is caught between the head portion of the bolt and the base, and there is a possibility that the head portion of the bolt will seize to the base. When there is no air supply due to power failure or the like, the head portion of the bolt may be grounded to the base and dragged, and there is a possibility that the head portion of the bolt will seize to the base. When such seizure occurs, the head portion of the bolt is welded to the base, making it impossible to float the gas bearing pad.

The present invention has been made in view of the problems described above, and an object thereof is to provide a gas bearing pad that can prevent seizure of a head portion of a bolt to a base.

Solution to Problem

The above objects of the present invention are achieved by the following configurations.

(1) A gas bearing pad including: a main body portion disposed on a base including a guide surface and including a recess portion on a facing surface that faces the guide surface; a porous body fitted into the recess portion of the main body portion; and a bolt inserted into a bolt insertion hole provided in the porous body to fix the porous body to the main body portion, in which a gas bearing is formed between the porous body and the base by blowing compressed gas from the main body portion through the porous body toward the base, a counterbore hole that accommodates a head portion of the bolt is provided in the bolt insertion hole, and in the counterbore hole, a space is provided between a top surface that faces the guide surface in the head portion of the bolt and a bearing surface that faces the guide surface of the porous body.

(2) A gas bearing pad according to (1), in which, when the gas bearing is formed, a clearance dimension from the bearing surface of the porous body to the top surface of the head portion of the bolt is greater than a clearance dimension from the guide surface to the bearing surface of the porous body.

Advantageous Effects of Invention

According to the present invention, in the counterbore hole, a space is provided between the top surface that faces the guide surface in the head portion of the bolt and the bearing surface that faces the guide surface of the porous body. As a result, even when foreign matter enters between the gas bearing pad in drive and the base, the intruded foreign matter will not enter the space and be caught between the head portion of the bolt and the base, and thus seizure of the head portion of the bolt to the base can be prevented. Even when there is no air supply due to power failure or the like, the head portion of the bolt is not grounded to the base, and thus seizure of the head portion of the bolt to the base can be prevented.

DESCRIPTION OF EMBODIMENTS

One embodiment of a gas bearing pad according to the present invention will be described in detail below with reference to the drawings.

Figure 1:
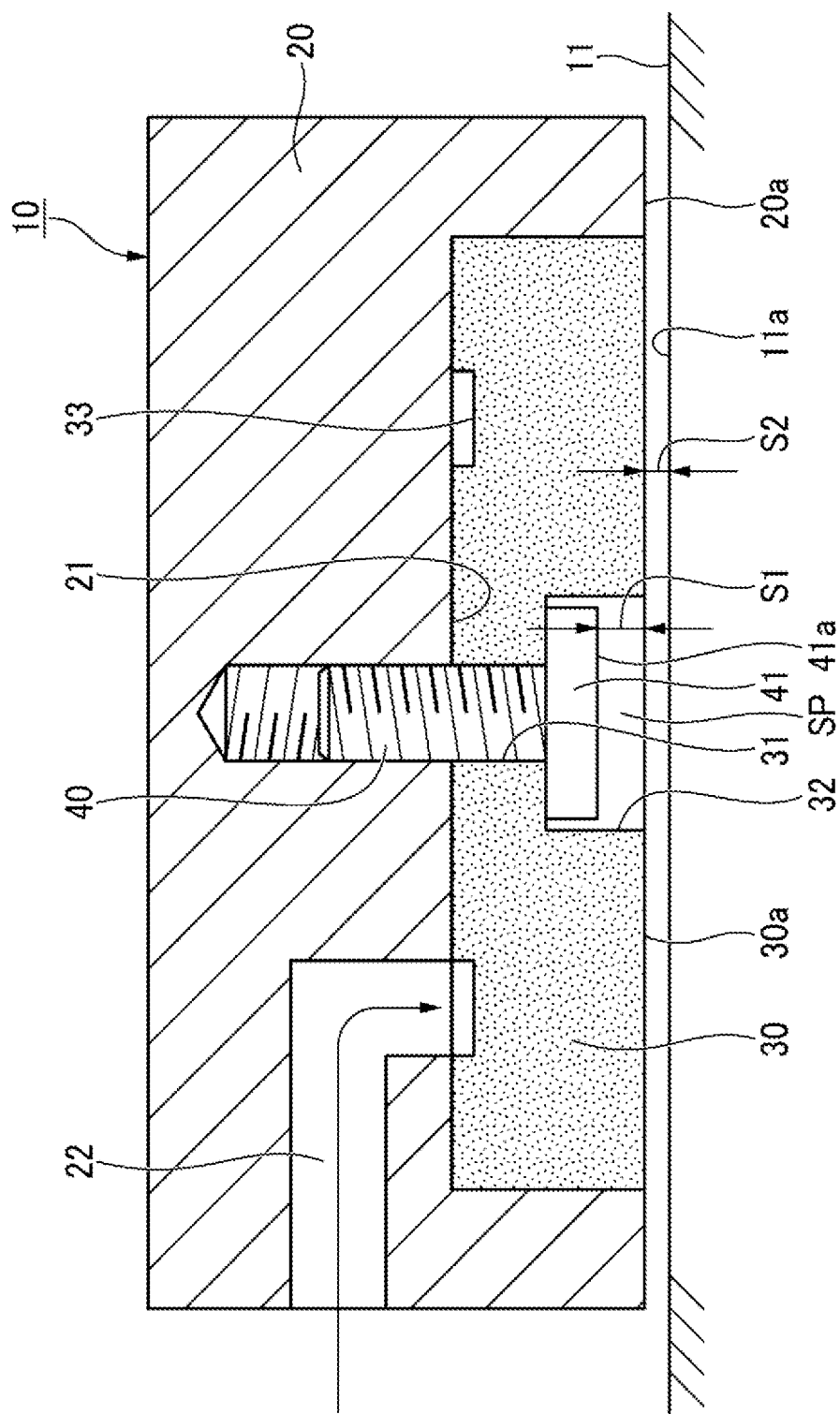
FIG. 1 is a cross-sectional view for describing one embodiment of a gas bearing pad according to the present invention.
Figure 2:
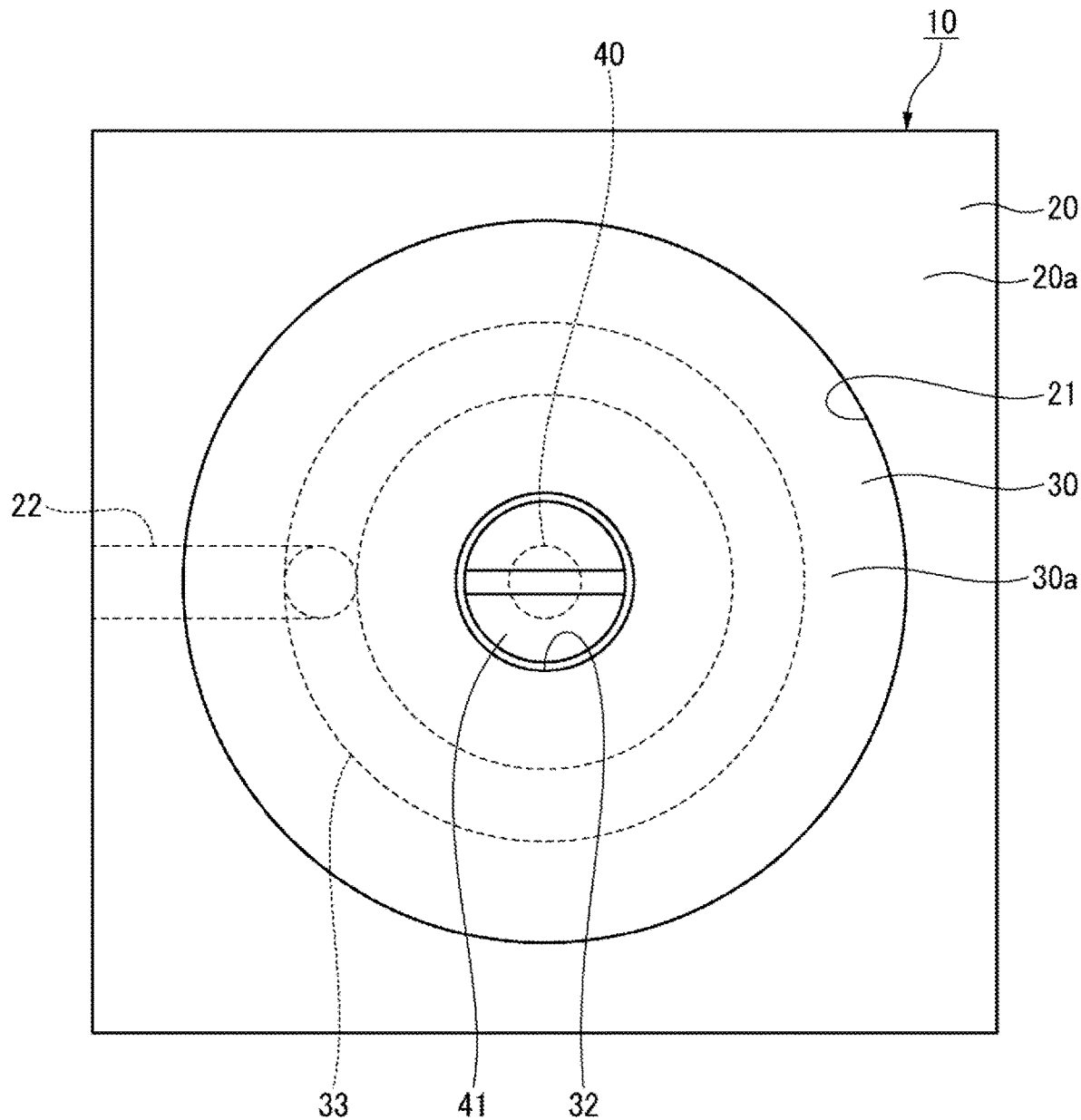
FIG. 2 is a bottom view of the gas bearing pad shown in FIG. 1.

As shown in FIGS. 1 and 2, a gas bearing pad 10 of the present embodiment includes a main body portion 20 disposed on a base 11 including a guide surface 11a, and including a recess portion 21 on a facing surface 20a that faces the guide surface 11a; a porous body 30 fitted into the recess portion 21 of the main body portion 20; and a bolt 40 inserted into a bolt insertion hole 31 provided in the porous body 30 to fix the porous body 30 to the main body portion 20. The main body portion 20 is formed of ceramic or the like, the porous body 30 is formed of graphite or the like, and the bolt 40 is formed of a ferrous material such as steel.

The main body portion 20 has a rectangular parallelepiped shape, and the circular recess portion 21 is formed on the facing surface 20a that faces the guide surface 11a. The main body portion 20 is formed with a gas flow path 22 for supplying compressed gas supplied from a compressed gas pipe (not shown) to the porous body 30 inside the recess portion 21.

The porous body 30 is disk-shaped. A bearing surface 30a that faces the guide surface 11a of the porous body 30 is formed to be flush with the facing surface 20a of the main body portion 20. The bolt insertion hole 31 is formed in the central portion of the porous body 30. A counterbore hole 32 for accommodating a head portion 41 of the bolt 40 is formed on the bearing surface 30a side of the bolt insertion hole 31. An annular groove 33 serving as a flow path for compressed gas is formed around the bolt insertion hole 31 on the surface of the porous body 30 opposite to the bearing surface 30a (upper surface in FIG. 1). The porous body 30 is a porous material having an appropriate air permeability.

In the present embodiment, the counterbore hole 32 of the bolt insertion hole 31 is formed with a depth greater than the thickness of the head portion 41 of the bolt 40. Therefore, in the counterbore hole 32, a space SP is formed between a top surface 41a that faces the guide surface 11a in the head portion 41 of the bolt 40 and the bearing surface 30a of the porous body 30.

In the present embodiment, when the gas bearing is formed, a clearance dimension S1 from the bearing surface 30a of the porous body 30 to the top surface 41a of the head portion 41 of the bolt 40 is set to be greater than a clearance dimension S2 from the guide surface 11a of the base 11 to the bearing surface 30a of the porous body 30.

In the gas bearing pad 10 configured as described above, the compressed gas is blown out from the gas flow path 22 of the main body portion 20 through the porous body 30 toward the guide surface 11a of the base 11, and accordingly, a gas bearing is formed between the porous body 30 and the base 11. Accordingly, the gas bearing pad 10 can move in a non-contact state with respect to the guide surface 11a of the base 11.

As described above, according to the gas bearing pad 10 of the present embodiment, in the counterbore hole 32, the space SP is formed between the top surface 41a of the head portion 41 of the bolt 40 and the bearing surface 30a of the porous body 30. As a result, even when foreign matter enters between the gas bearing pad 10 in drive and the base 11, the intruded foreign matter will not enter the space SP and be caught between the head portion 41 of the bolt 40 and the base 11, and thus seizure of the head portion 41 of the bolt 40 to the base 11 can be prevented. Even when there is no air supply due to power failure or the like, the head portion 41 of the bolt 40 is not grounded to the base 11, and thus seizure of the head portion 41 of the bolt 40 to the base 11 can be prevented.

According to the gas bearing pad 10 of the present embodiment, the clearance dimension S1 from the bearing surface 30a of the porous body 30 to the top surface 41a of the head portion 41 of the bolt 40 is set to be greater than the clearance dimension S2 from the guide surface 11a of the base 11 to the bearing surface 30a of the porous body 30. Therefore, even when the gas bearing pad 10 stops driving while foreign matter entered between the gas bearing pad 10 and the base 11, the intruded foreign matter is not caught between the head portion 41 of the bolt 40 and the base 11, and thus, the seizure of the head portion 41 of the bolt 40 to the base 11 can be prevented.

According to the gas bearing pad 10 of the present embodiment, the space SP of the counterbore hole 32 becomes an air pocket, and thus constant pressure is accumulated in the space SP, and self-excited vibration caused by an air film can be reduced.

Note that the present invention is not limited to those illustrated in the above embodiments, and can be modified as appropriate without departing from the gist of the present invention.

For example, the shape of the main body portion and the porous body, whether an annular groove is provided in the porous body, the shape of the gas flow path, and the like can be freely set.

REFERENCE SIGNS LIST

10 Gas bearing pad
11 Base
11a Guide surface
20 Main body portion
20a Facing surface
21 Recess portion
22 Gas flow path
30 Porous body
30a Bearing surface
31 Bolt insertion hole
32 Counterbore hole
33 Groove
40 Bolt
41 Head portion
41a Top surface
SP Space
S1 Clearance dimension from bearing surface of porous body to top surface of head portion of bolt
S2 Clearance dimension from guide surface of base to bearing surface of porous body

The invention claimed is:
1. A gas bearing pad comprising:
a main body portion disposed on a base including a guide surface and including a recess portion on a facing surface that faces the guide surface;
a porous body fitted into the recess portion of the main body portion; and
a bolt inserted into a bolt insertion hole provided in the porous body to fix the porous body to the main body portion, wherein
a gas bearing is formed between the porous body and the base by blowing compressed gas from the main body portion through the porous body toward the base,
a counterbore hole that accommodates a head portion of the bolt is provided in the bolt insertion hole, and
in the counterbore hole, a space is provided between a top surface of the head portion of the bolt that faces the guide surface and a bearing surface of the porous body that faces the guide surface.
2. A gas bearing pad according to claim 1, wherein when the gas bearing is formed, a clearance dimension from the bearing surface of the porous body to the top surface of the head portion of the bolt is greater than a clearance dimension from the guide surface to the bearing surface of the porous body.

* * * * *